US012326586B2

(12) United States Patent
Le et al.

(10) Patent No.: US 12,326,586 B2
(45) Date of Patent: Jun. 10, 2025

(54) LOW WAVE-FRONT ERROR OPTICAL FILTER FILM

(71) Applicant: 3M INNOVATIVE PROPERTIES COMPANY, St. Paul, MN (US)

(72) Inventors: John D. Le, Woodbury, MN (US); Kazuta Saito, Tokyo (JP); Michael L. Steiner, New Richmond, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 533 days.

(21) Appl. No.: 17/760,517

(22) PCT Filed: Aug. 17, 2020

(86) PCT No.: PCT/IB2020/057743
§ 371 (c)(1),
(2) Date: Mar. 15, 2022

(87) PCT Pub. No.: WO2021/053424
PCT Pub. Date: Mar. 25, 2021

(65) Prior Publication Data
US 2022/0350066 A1    Nov. 3, 2022

Related U.S. Application Data

(60) Provisional application No. 62/903,156, filed on Sep. 20, 2019.

(51) Int. Cl.
*G02B 5/30*    (2006.01)
*G02B 27/28*    (2006.01)

(52) U.S. Cl.
CPC ........... *G02B 5/305* (2013.01); *G02B 27/283* (2013.01)

(58) Field of Classification Search
CPC .... G02B 5/305; G02B 5/3041; G02B 27/283; G02B 5/30

(Continued)

(56) References Cited

U.S. PATENT DOCUMENTS

2003/0016334 A1*  1/2003  Weber ............... G02B 27/283
                                                    353/20
2006/0221447 A1* 10/2006  DiZio ............... G02B 5/305
                                                    359/487.04

(Continued)

FOREIGN PATENT DOCUMENTS

JP     2005-157242      6/2005
JP     6206553 B1      10/2017

(Continued)

OTHER PUBLICATIONS

International Search report for PCT International Application No. PCT/IB2020/057743 mailed on Nov. 10, 2020, 4 pages.

*Primary Examiner* — Stephone B Allen
*Assistant Examiner* — Leonidas Boutsikaris
(74) *Attorney, Agent, or Firm* — Clifton F. Richardson; Robert S. Moshrefzadeh

(57) ABSTRACT

An optical assembly including a first optical substrate including a first major surface; a multilayer polymeric optical film disposed on the first major surface of the first optical substrate and including a plurality of polymeric layers numbering greater than about 50 in total; and a first optical bonding layer having an average thickness of less than about 0.5 microns and disposed between, and making physical contact to, the first major surface of the first optical substrate and the multilayer polymeric optical film, the first optical bonding layer bonding the first optical substrate to the multilayer polymeric optical film and including a silanated amine.

19 Claims, 6 Drawing Sheets

(58) Field of Classification Search
USPC .......................................................... 359/352
See application file for complete search history.

(56) References Cited

U.S. PATENT DOCUMENTS

| | | | |
|---|---|---|---|
| 2013/0250405 A1* | 9/2013 | Kivel | G02B 5/3041 |
| | | | 359/359 |
| 2015/0044456 A1 | 2/2015 | Chien | |
| 2015/0219896 A1* | 8/2015 | Ouderkirk | G02B 5/30 |
| | | | 359/630 |
| 2015/0360247 A1 | 12/2015 | Fournand | |
| 2018/0030189 A1 | 2/2018 | Knapp | |
| 2018/0081224 A1 | 3/2018 | Kamo | |
| 2019/0101815 A1 | 4/2019 | Maeda | |
| 2019/0309193 A1* | 10/2019 | Okada | G02B 5/3033 |

FOREIGN PATENT DOCUMENTS

| | | |
|---|---|---|
| JP | 2018063300 A | 4/2018 |
| WO | 2008042648 A1 | 4/2008 |
| WO | 2015152050 A1 | 10/2015 |
| WO | WO 2018-008443 | 1/2018 |
| WO | WO 2018-050608 | 3/2018 |
| WO | 2018136366 A1 | 7/2018 |
| WO | WO 2019-058778 | 3/2019 |

* cited by examiner

LOW WAVE-FRONT ERROR OPTICAL FILTER FILM

CROSS REFERENCE TO RELATED APPLICATIONS

This application is a national stage filing under 35 U.S.C. 371 of PCT/IB2020/057743 filed Aug. 17, 2020, which claims the benefit of U.S. Provisional Application No. 62/903,156, filed Sep. 20, 2019, the disclosures of which are incorporated by reference in their entireties herein.

SUMMARY

In some aspects of the present description, an optical assembly is provided, including a first optical substrate including a first major surface; a multilayer polymeric optical film disposed on the first major surface of the first optical substrate and including a plurality of polymeric layers numbering greater than about 50 in total; and a first optical bonding layer having an average thickness of less than about 0.5 microns and disposed between, and making physical contact to, the first major surface of the first optical substrate and the multilayer polymeric optical film, the first optical bonding layer bonding the first optical substrate to the multilayer polymeric optical film and including a silanated amine.

In some aspects of the present description, an polarizing beam splitter is provided, including a multilayer polymeric reflective polarizer disposed between first and second optical prisms, an optical bonding layer making physical contact with and bonding the reflective polarizer to each of the first and second optical prisms and having an average thickness less than about 0.2 microns, wherein the first and second optical prisms cannot be separated from each other without damage to the reflective polarizer.

In some aspects of the present description, a polarizing beam splitter is provided, including a multilayer polymeric reflective polarizer disposed between first and second optical prisms and including opposing first and second major surfaces; a first optical bonding layer making physical contact with and bonding the first major surface of the reflective polarizer to the first optical prism; and a second optical bonding layer making physical contact with and bonding the second major surface of the reflective polarizer to the second optical prism, wherein the first and second optical prisms cannot be separated from each other without damage to the reflective polarizer, and wherein for light at a wavelength of 0.6328 microns incident on the polarizing beam splitter from each of the first and second major surface sides of the reflective polarizer, the polarizing beam splitter has a reflected root mean square wavefront error of less than about 0.5.

In some aspects of the present invention, an optical assembly is provided, including a first optical substrate including a first major surface; an optical film disposed on the first major surface of the first optical substrate, such that for substantially normally incident light and for each wavelength in a predetermined wavelength range extending over at least 50 nanometers, the optical film reflects at least 60% of the incident light for at least a first polarization state; and a first optical bonding layer having an average thickness of less than about 0.5 microns and disposed between, and making physical contact to, the first major surface of the first optical substrate and the optical film, the first optical bonding layer bonding the first optical substrate to the optical film and comprising a silanated amine, and wherein for light at a wavelength of 0.6328 microns incident on the optical film from each major side of the optical film, the optical assembly has a reflected root mean squared wave front error of less than about 0.5.

DETAILED DESCRIPTION

Figure 1A:
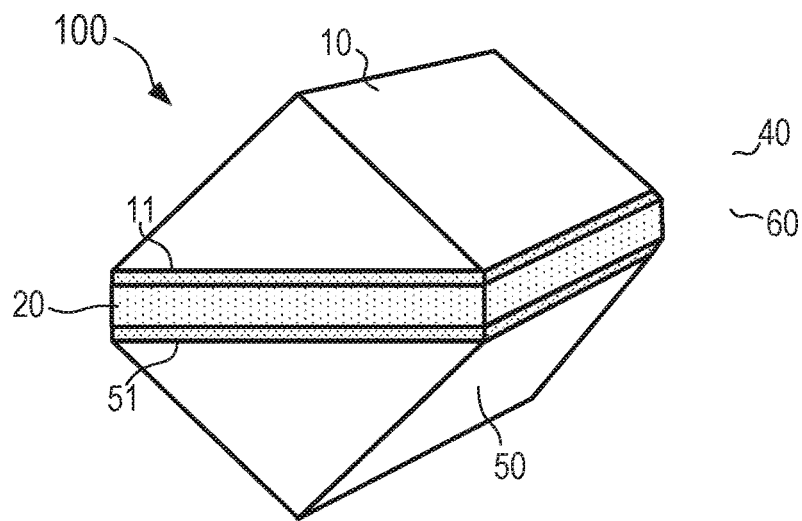
FIG. 1A is a perspective view of a polarizing beam splitter, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films (MOF) such as MOF reflective polarizers and optical filter films have not been widely adopted for reflecting imaging optics because they traditionally exhibit a relatively high wave-front error compared to a conventional reflective imaging plane (e.g., a multilayer coating made by physical vapor deposition, or a wire-grid coating.) Existing lamination methods that might be used to apply an MOF to an optical assembly have process challenges which do not allow them to meet industry standards. For the purposes of this specification, a reflected wavefront error is defined as the degree of deviation seen in an optical wavefront when light is reflected off the surface of an optical component compared to that seen reflected from a perfectly flat (i.e., planar) surface. Existing industry standards may specify a reflected root mean square (RMS) wavefront error of less than 1 wave wave-front error (or even ½ wave, ¼ wave, or ⅛ wave error). For the purposes of this specification, a transmitted wavefront error is defined as the degree of deviation seen in an optical wavefront when light is transmitted through an optical component (e.g., a lens).

According to some aspects of the present description, a silane coupling agent is used to adhere an optical film (e.g., a reflective polarizer MOF) directly to low-wave-front optics via a nanometer thick bonding layer, allowing the film to replicate the surface of the low-wave-front optics component to which it is adhered. In some embodiments, an optical assembly (e.g., a polarizing beam splitter, or an optical lens) includes a first optical substrate (e.g., a window, lens, or prism) including a first major surface; a multilayer polymeric optical film disposed on the first major surface of the first optical substrate; and a first optical bonding layer disposed between, and making physical contact to, the first major surface of the first optical substrate and the optical film. In some embodiments, the first optical bonding layer bonds the first optical substrate to the optical film. In some embodiments, the first optical bonding layer may include a silanated amine. For example, in some embodiments, the silanated amine may include one or more of a 3-aminophenyl trimethoxy silane (APTMS), a 3-aminopropyl trimethoxy silane (APrTMS), a 3-aminopropyl triethyl silane (APrTES), and a 3-aminophenyl triethoxy silane (APTES). In some embodiments, the average thickness of the first optical bonding layer may be less than about 0.5 microns, or less than about 0.25 microns, or less than about 0.2 microns, or less than about 0.15 microns.

In some embodiments, the first optical substrate may be a plane-parallel plate with opposing first and second major planar surfaces, such that the first major surface of the first optical substrate is the first planar major surface of the plane parallel plate. In some embodiments, the first optical substrate is curved and includes opposing first and second curved major surfaces, such that the first major surface of the first optical substrate is the first curved major surface of the curved first optical substrate. In some embodiments, the first optical substrate may be an optical lens with opposing first and second major surfaces, at least one of which is curved, such that the first major surface of the first optical substrate in one of the first and second major surfaces of the optical lens.

In some embodiments, the optical film may include a plurality of polymeric layers numbering greater than about 50 layers in total. In some embodiments, the optical film may include a reflective polarizer, such that, for substantially normally incident light and for at least one wavelength of light, the reflective polarizer may reflect at least 60% of the incident light having a first polarization state (e.g., light having a linear s-polarization state, also known as s-pol light) and transmit at least 60% of the incident light having an orthogonal second polarization state (e.g., p-pol light). It should be noted that the polarization states discussed above are examples only, and not intended to be limiting. For example, the first polarization state may be p-pol light and the second polarization state may be s-pol light. As another example, the first polarization state may be a linear polarization type, and the second polarization state may be a circular polarization state. In some embodiments, the plurality of polymeric layers may form alternating first and second polymeric layers, where the first polymeric layers are substantially isotropic, and the second polymeric layers are substantially birefringent. In some embodiments, the birefringent second polymeric layers may have in-plane indices of refraction nx and ny along orthogonal directions, where a difference between nx and ny is greater than about 0.01. In some embodiments, the reflective polarizer may, for the at least one wavelength in the infrared wavelength range, reflect at least 60% of the incident light for the second polarization state.

In some embodiments, the optical film may include an optical reflector, such that, for substantially normally incident light, and for at least one wavelength in a visible wavelength range extending from about 400 nm to about 700 nm, the optical reflector reflects at least 60% of the incident light for each of mutually orthogonal first and second polarization states. In some embodiments, for at least one wavelength in an infrared wavelength range extending from about 750 nm to about 1200 nm, the optical reflector transmits at least 60% of the incident light for each of the first and second polarization states. In some embodiments, the optical film may include an optical reflector, such that for substantially normally incident light and for at least one wavelength in an infrared wavelength range extending from about 750 nm to about 1200 nm, the optical reflector reflects at least 60% of the incident light for at least a first polarization state, and for at least one wavelength in a visible wavelength range extending from about 400 nm to about 700 nm, the optical reflector transmits at least 60% of the incident light for each of the first and an orthogonal second polarization states.

In some embodiments, the optical assembly may further include a second optical substrate with a first major surface, and a second optical bonding layer. In some embodiments, the second optical bonding layer may be disposed between and in physical contact with the first major surface of the second optical substrate and the optical film, bonding the second optical substrate to the optical film. In some embodiments, the second optical bonding layer may be a silanated amine. In some embodiments, the second optical bonding layer may have an average thickness less than about 0.5 microns, or less than about 0.25 microns, or less than about 0.2 microns, or less than about 0.15 microns. In some embodiments, the first optical substrate may be a prism, and the first major surface may be the hypotenuse of the prism. In some embodiments, the second optical substrate may be a second prism, and the first major surface of the second optical substrate may be the hypotenuse of the second prism.

According to some aspects of the present description, a polarizing beam splitter includes a multilayer polymeric reflective polarizer disposed between first and second optical prisms, an optical bonding layer making physical contact with and bonding the reflective polarizer to each of the first and second optical prisms, wherein the first and second optical prisms cannot be separated from each other without damage to the reflective polarizer. In some embodiments, the optical bonding layer may have an average thickness less than about 0.2 microns. In some embodiments, the polarizing beam splitter may have a reflected root mean square wavefront error of less than about 0.75 waves, or less than about 0.5 waves, or less than about 0.25 waves, or less than about 0.2 waves, at a wavelength of 0.6328 microns. In some embodiments, the optical bonding layer may be a first optical bonding layer (bonding the first optical prism to a first side of the reflective polarizer) and a second optical bonding layer (bonding the second optical prism to a second side of the reflective polarizer).

According to some aspects of the present description, a polarizing beam splitter includes a multilayer polymeric reflective polarizer disposed between first and second optical prisms and including opposing first and second major surfaces; a first optical bonding layer making physical contact with and bonding the first major surface of the reflective polarizer to the first optical prism; and a second optical bonding layer making physical contact with and bonding the second major surface of the reflective polarizer to the second optical prism. In some embodiments, the first and second optical prisms cannot be separated from each other without damage to the reflective polarizer. In some embodiments, for light at a wavelength of about 0.6328 microns incident on the polarizing beam splitter from each of the first and second major surface sides of the reflective polarizer, the polarizing beam splitter may have a reflected root mean square wavefront error of less than about 0.5. In some embodiments, the polarizing beam splitter may have a transmitted root mean square wavefront error of less than about 0.07 waves at a wavelength of 0.6328 microns.

According to some aspects of the present description, an optical assembly is provided, including a first optical substrate including a first major surface; an optical film (e.g., a reflective polarizer, an optical reflector, etc.) disposed on the first major surface of the first optical substrate, such that for substantially normally incident light and for each wavelength in a predetermined wavelength range extending over at least 50 nanometers, the optical film reflects at least 60%, or at least 70%, or at least 80% of the incident light for at least a first polarization state (e.g., light with a polarization state aligned to the x-axis, or alternately aligned to the y-axis); and a first optical bonding layer having an average thickness of less than about 0.5 microns and disposed between, and making physical contact to, the first major surface of the first optical substrate and the optical film, the first optical bonding layer bonding the first optical substrate to the optical film and comprising a silanated amine (e.g., APTMS, APrTMS, APrTES, APTES, etc.), and wherein for light at a wavelength of 0.6328 microns incident on the optical film from each major side of the optical film, the optical assembly has a reflected root mean squared wave front error of less than about 0.5.

Figure 1B:
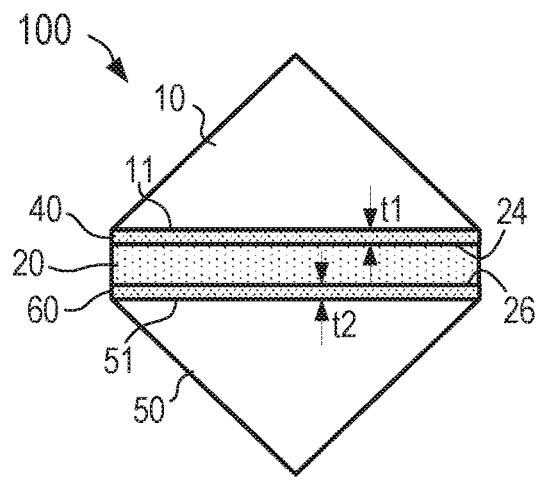
FIG. 1B is a side view of a polarizing beam splitter, in accordance with an embodiment of the present description.
Figure 1C:
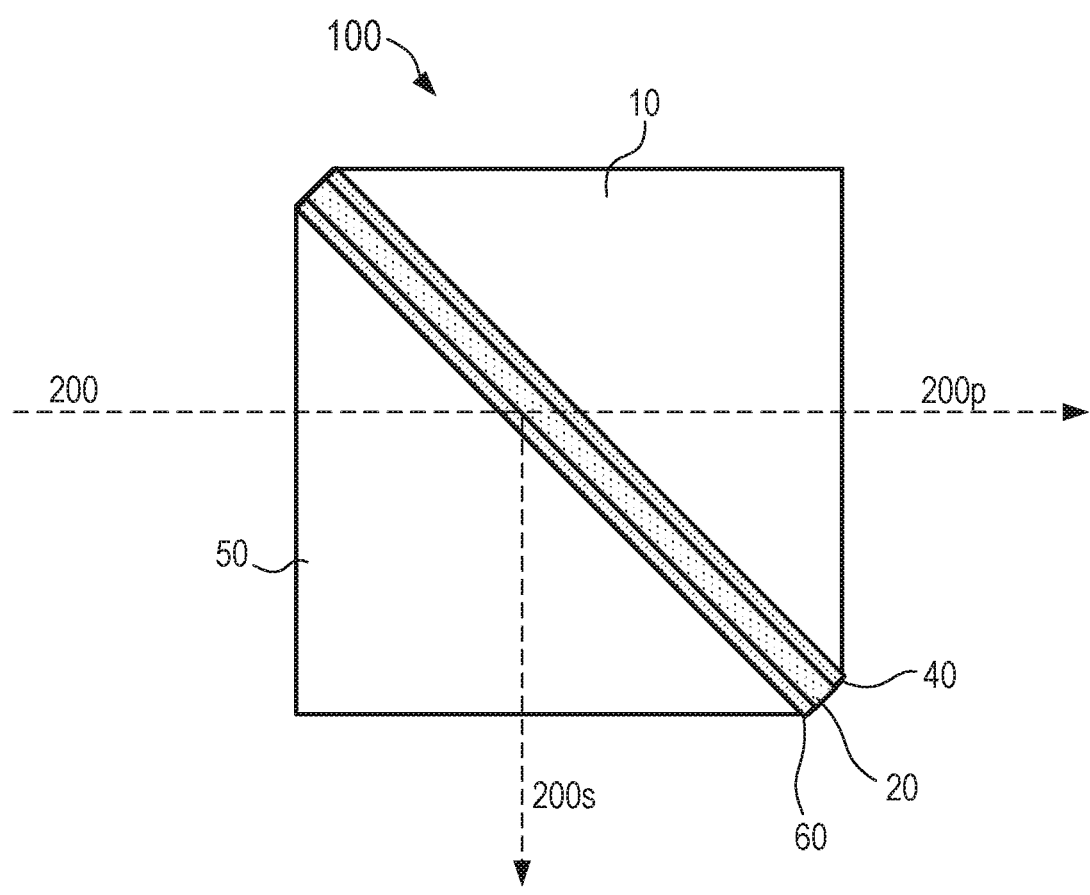
FIG. 1C is a side view of a polarizing beam splitter in operation, in accordance with an embodiment of the present description.

Turning now to the figures, FIGS. 1A-1C provide views of a polarizing beam splitter according to an embodiment described herein. FIG. 1A is a perspective view of an optical assembly 100 (e.g., a polarizing beam splitter) including a first optical substrate 10 (e.g., a first optical prism) and a second optical substrate 50 (e.g., a second optical prism), separated by a multilayer optical film (MOF) reflective polarizer 20. In some embodiments, a first optical bonding layer 40 is disposed between a first major surface 11 of the first optical substrate 10 and the reflective polarizer 20. The first optical bonding layer 40 bonds the first optical substrate 10 to the reflective polarizer 20, and, in some embodiments, comprises a silanated amine. The use of a silanated amine (e.g., a silane coupling agent) adheres the optical components with a nanometer-thick bonding layer, resulting in an interface between components that has a relatively low wave-front error. In some embodiments, a second bonding layer 60 is disposed between a first major surface 51 of the second optical substrate 50 and an opposing side of the reflective polarizer 20.

FIG. 1B shows a side view of the optical assembly 100 of FIG. 1A, providing additional details. Reflective polarizer 20 features a first major surface 24 and a second major surface 26 which are opposing sides of reflective polarizer 20. In some embodiments, first optical bonding layer 40 is disposed between and adheres the first major surface 11 of optical substrate 10 and the first major surface 24 of reflective polarizer 20. In some embodiments, first optical bonding layer 40 has an average thickness t1 of less than about 0.5 microns, or less than about 0.4 microns, or less than about 0.3 microns. In some embodiments, second optical bonding layer 60 is disposed between and adheres the first major surface 51 of optical substrate 50 and the second major surface 26 of reflective polarizer 20. In some embodiments, second optical bonding layer 60 has an average thickness t2 of less than about 0.5 microns, or less than about 0.4 microns, or less than about 0.3 microns.

FIG. 1C shows a side view of the optical assembly 100 of FIGS. 1A and 1B, in operation as a polarizing beam splitter. In the embodiment shown, incident light ray 200, which represents non-polarized light, enters in one surface of optical assembly 100, entering second optical substrate 50 (i.e., second optical prism 50). Light ray 200 passes through second bonding layer 60 substantially unaltered and impacts on a surface of reflective polarizer 20. In some embodiments, reflective polarizer 20 allows light of a first polarization state 200$p$ (e.g., p-pol light) to be transmitted through reflective polarizer 20, passing into first optical substrate 10 (i.e., first optical prism 20), and causes light of a second polarization state 200$s$ (e.g., s-pol light) to be reflected (i.e., causing light ray 200 to split into 200$p$ and 200$s$). As shown in FIG. 1C, light ray 200$p$ is representative of a transmitted wavefront, and light ray 200$s$ is representative of a reflected wavefront.

Figure 2A:
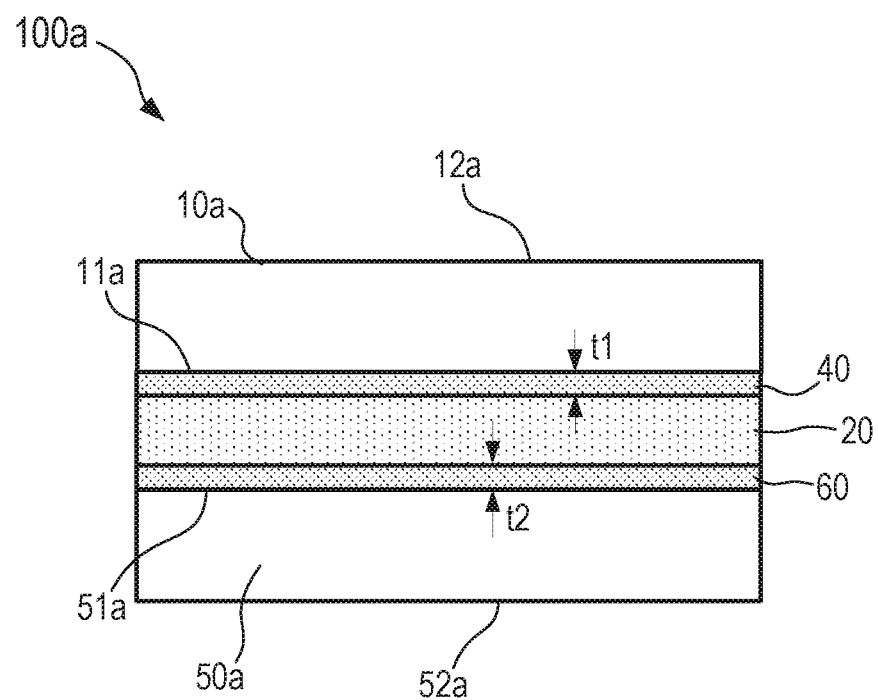
FIGS. 2A and 2B provide side views of an optical assembly, in accordance with an embodiment of the present description.

FIG. 2A is a side view of an optical assembly 100$a$, according to an embodiment described herein. In the embodiment 100$a$ shown, the first optical substrate is a first plane-parallel plate 10$a$ including first planar major surface 11$a$ and opposing second planar major surface 12$a$, and the second optical substrate is a second plane-parallel plate 50$a$ including first planar major surface 51$a$ and opposing second planar major surface 52$a$. As with embodiment 100 of FIGS. 1A-1C, optical assembly 100$a$ includes a multilayer polymeric optical film (e.g., a reflective polarizer)20 disposed between first plane-parallel plate 10$a$ and second plane-parallel plate 50$a$. A first optical bonding layer 40 is disposed between first plane-parallel plate 10$a$ and optical film 20 (adhering first planar major surface 11$a$ to a first side of optical film 20). A second optical bonding layer 60 is disposed between first plane-parallel plate 50$a$ and reflective polarizer 20 (adhering first planar major surface 51$a$ to a second side of optical film 20). In some embodiments, first optical bonding layer 40 has an average thickness t1 of less than about 0.5 microns, or less than about 0.4 microns, or less than about 0.3 microns. In some embodiments, second optical bonding layer 60 has an average thickness t2 of less than about 0.5 microns, or less than about 0.4 microns, or less than about 0.3 microns. The embodiment shown in FIG. 2A, utilizing first 10$a$ and second 50$a$ plane-parallel plates, may represent a polarizing window or lens for transmitting light of a certain polarization type (e.g., p-pol or s-pol light).

Figure 2B:
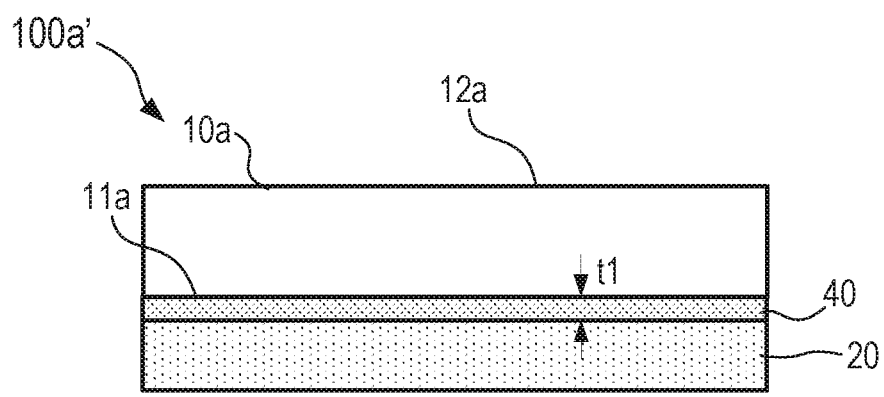

In some embodiments, the optical assembly may include only a first optical substrate 10$a$, and may not include second optical substrate 50$a$ and second optical bonding layer 60. This embodiment is illustrated in FIG. 2B, depicting alternate embodiment optical assembly 100$a'$. In other words, the concepts described herein apply to optical assemblies including only a single substrate and single optical bonding layer, and do not in all embodiments require an optical film sandwiched between a first and second substrate. All reference numerals repeated in FIG. 2B refer to components common to like-numbered components in FIG. 2A, and are not further described herein.

Figure 3:
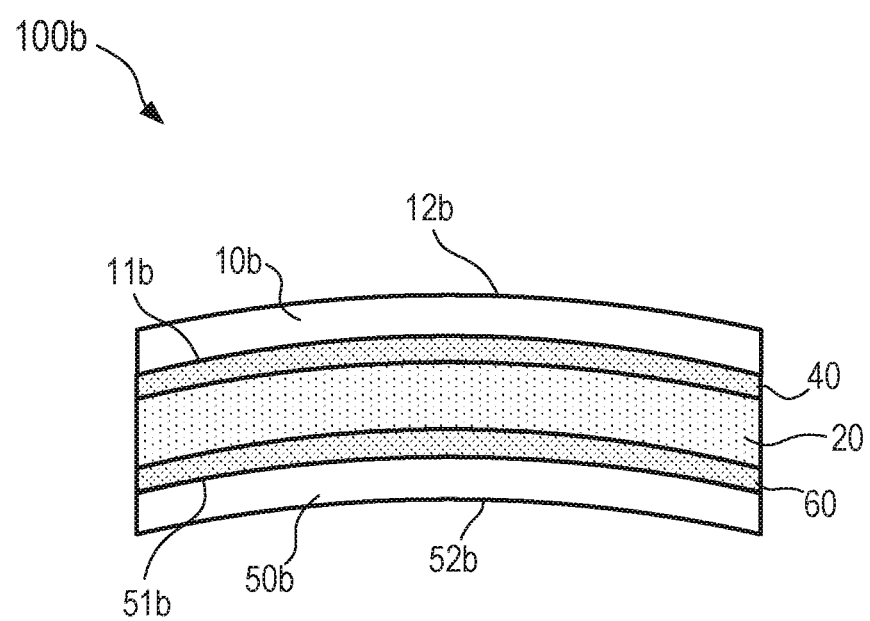
FIG. 3 is a side view of an optical assembly with curved surfaces, in accordance with an embodiment of the present description.

FIG. 3 is a side view of an optical assembly 100$b$ with curved surfaces, according to an embodiment described herein. In the embodiment of FIG. 3, one or more of the first 10$b$ and second 50$b$ optical substrates may have one or more curved major surfaces. Although the embodiment shown in FIG. 3 shows both major surfaces 11$b$ and 12$b$ of the first optical substrate 10$b$, as well as both major surfaces 51$b$ and 52$b$ of second optical substrate 50$b$, as being curved, there may be some embodiments in which only a subset of these surfaces is curved. For example, in one embodiment, only major surface 12$b$ of first optical substrate 10$b$ may be curved, while surfaces 11$b$, 51$b$, and 52$b$ (as well as the opposing major surfaces of optical film 20) are planar surfaces. Other example configurations are possible. For example, in some embodiments, optical assembly 100$b$ may include only a first optical substrate 10$b$, and not include second optical substrate 50$b$ or second optical bonding layer 60.

Figure 4:
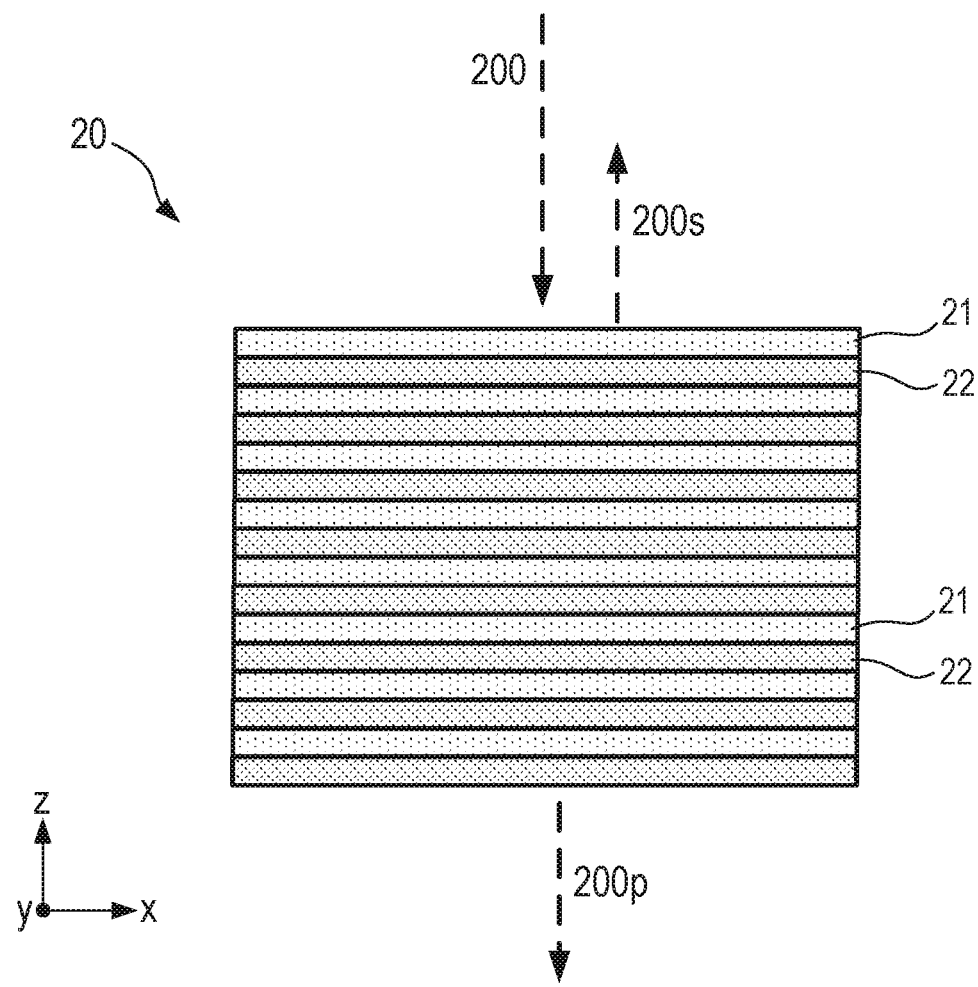
FIG. 4 is a side view of a multilayer polymeric optical film, in accordance with an embodiment of the present description.

In some embodiments, the multilayer polymeric optical film 20 of the previous figures may be constructed from a plurality of layers of polymeric materials. FIG. 4 illustrates an embodiment of the optical film 20 constructed as a multilayer optical film (MOF). In some embodiments, the optical film 20 includes a plurality of alternating first polymeric layers 21 and second polymeric layers 22. In some embodiments, the combined alternating first 11 and second 22 polymeric layers may number between 50 and 700. In some embodiments, each first 21 and second 22 polymeric layer may have an average thickness less than about 500 nm.

In some embodiments, the first polymeric layers 21 may be substantially isotropic (i.e., exhibiting substantially identical indices of refraction when measured in different directions). In some embodiments, the second polymeric layers 22 may be substantially birefringent (i.e., exhibiting two different indices of refraction when measured in different, orthogonal directions) and have in-plane indices of refraction nx and ny along orthogonal directions, with a difference between nx and ny being greater than about 0.01. Constructing the optical film 20 in such a manner creates a MOF which, when an incident light ray 200 impinges on the film, at least 60%, or at least 70%, or at least 80%, or at least 90% of the incident light 200 having a first polarization state is reflected as reflected light ray 200s, and at least 60%, or at least 70%, or at least 80%, or at least 90% of the incident light 200 having a second polarization state is transmitted as transmitted light ray 200p (e.g., a reflective polarizer). As discussed elsewhere herein, although the example of FIG. 4 is labeled showing light 200s being reflected and light 200p being transmitted, the actual polarization states may be something other than s-pol light and p-pol light. Any appropriate, different types of light polarization may be used consistent with the description herein.

Figure 5:
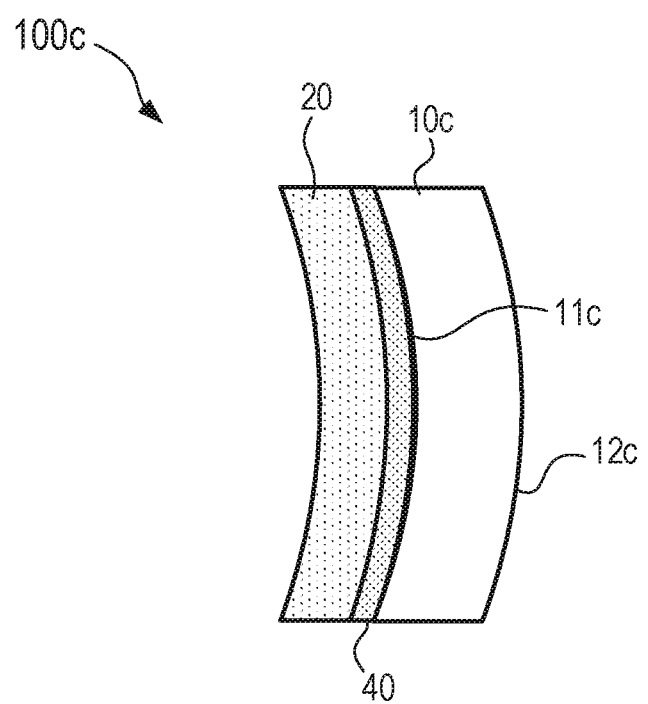
FIG. 5 is a side view of an optical lens assembly, in accordance with an embodiment of the present description.

Finally, FIG. 5 is a side view of an alternate optical assembly, in the form of an optical lens assembly 100c. In the embodiment shown, a multilayer optical film 20 is adhered to an optical lens 10c having opposing first 11c and second 12c major surfaces. In some embodiments, disposed between and adhering the optical film 20 and optical lens 10c is an optical bonding layer 40. In some embodiments, at least one of major surfaces 11c and 12c is curved. In some embodiments, both major surfaces 11c and 12c, as well as optical film 20, are curved. In some embodiments, optical lens assembly 100c may allow light of a first polarization state (e.g., s-pol light) to be reflected from a surface of the optical film 20, and light of a second polarization state (e.g., p-pol light) to be substantially transmitted through the optical film 20, passing through optical lens assembly 100c. In some embodiments, and for some applications, optical assembly 100c may further include a second optical substrate 50c and a second optical bonding layer 60 (see, for example, the embodiment of FIG. 2A and FIG. 3).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical assembly comprising:
a first optical substrate comprising a first major surface;
a multilayer polymeric optical film disposed on the first major surface of the first optical substrate and comprising a plurality of polymeric layers numbering greater than about 50 in total; and
a first optical bonding layer having an average thickness of less than about 0.5 microns and disposed between, and making physical contact to, the first major surface of the first optical substrate and the multilayer polymeric optical film, the first optical bonding layer bonding the first optical substrate to the multilayer polymeric optical film and comprising a silanated amine, wherein the optical assembly has a reflected root mean square wavefront error of less than about 0.75 waves at a wavelength of 0.6328 microns.

2. The optical assembly of claim 1, wherein the multilayer polymeric optical film comprises a reflective polarizer, such that for substantially normally incident light and for at least one wavelength, the reflective polarizer reflects at least 60% of the incident light having a first polarization state and transmits at least 60% of the incident light having an orthogonal second polarization state.

3. The optical assembly of claim 1, wherein the multilayer polymeric optical film comprises an optical reflector, such that for substantially normally incident light and for at least one wavelength in a visible wavelength range extending from about 400 nm to about 700 nm, the optical reflector reflects at least 60% of the incident light for each of mutually orthogonal first and second polarization states.

4. The optical assembly of claim 3, wherein for at least one wavelength in an infrared wavelength range extending from about 750 nm to about 1200 nm, the optical reflector transmits at least 60% of the incident light for each of the first and second polarization states.

5. The optical assembly of claim 1, wherein the multilayer polymeric optical film comprises an optical reflector, such that for substantially normally incident light and for at least one wavelength in an infrared wavelength range extending from about 750 nm to about 1200 nm, the optical reflector reflects at least 60% of the incident light for at least a first polarization state, and for at least one wavelength in a visible wavelength range extending from about 400 nm to about 700 nm, the optical reflector transmits at least 60% of the incident light for each of the first and an orthogonal second polarization states.

6. The optical assembly of claim 5, such that for the at least one wavelength in the infrared wavelength range, the optical reflector reflects at least 60% of the incident light for the second polarization state.

7. The optical assembly of claim 1, wherein the first optical substrate is a prism, and the first major surface is a hypotenuse of the prism.

8. The optical assembly of claim 1, wherein the first optical substrate is a plane parallel plate comprising opposing first and second planar major surfaces, and the first major surface is the first planar major surface of the plane parallel plate.

9. The optical assembly of claim 1, wherein the first optical substrate is an optical lens comprising opposing first and second major surfaces at least one of which is curved, and the first major surface is one of the first and second major surfaces of the optical lens.

10. The optical assembly of claim 1 further comprising:
a second optical substrate comprising a first major surface; and
a second optical bonding layer having an average thickness of less than about 0.5 microns and disposed between, and making physical contact to, the first major surface of the second optical substrate and the multilayer polymeric optical film, the second optical bonding layer bonding the second optical substrate to the multilayer polymeric optical film and comprising a silanated amine.

11. A polarizing beam splitter comprising a multilayer polymeric reflective polarizer disposed between first and second optical prisms, an optical bonding layer making physical contact with and bonding the reflective polarizer to each of the first and second optical prisms and having an average thickness less than about 0.2 microns, wherein the polarizing beam splitter has a reflected root mean square wavefront error of less than about 0.75 waves at a wavelength of 0.6328 microns.

12. The polarizing beam splitter of claim 11, wherein the reflected root mean square wavefront error is less than about 0.5 waves at the wavelength of 0.6328 microns.

13. A polarizing beam splitter comprising:
a multilayer polymeric reflective polarizer disposed between first and second optical prisms and comprising opposing first and second major surfaces;
a first optical bonding layer making physical contact with and bonding the first major surface of the reflective polarizer to the first optical prism; and
a second optical bonding layer making physical contact with and bonding the second major surface of the reflective polarizer to the second optical prism, wherein for light at a wavelength of 0.6328 microns incident on the polarizing beam splitter from each of the first and second major surface sides of the reflective polarizer, the polarizing beam splitter has a reflected root mean square wavefront error of less than about 0.5 waves.

14. The polarizing beam splitter of claim 13 having a transmitted root mean square wavefront error of less than about 0.07 waves at the wavelength of 0.6328 microns.

15. The polarizing beam splitter of claim 11, wherein the reflected root mean square wavefront error is less than about 0.25 waves at the wavelength of 0.6328 microns.

16. An optical assembly comprising:
a first optical substrate comprising a first major surface;
an optical film disposed on the first major surface of the first optical substrate, such that for substantially normally incident light and for each wavelength in a predetermined wavelength range extending over at least 50 nanometers, the optical film reflects at least 60% of the incident light for at least a first polarization state; and
a first optical bonding layer having an average thickness of less than about 0.5 microns and disposed between, and making physical contact to, the first major surface of the first optical substrate and the optical film, the first optical bonding layer bonding the first optical substrate to the optical film and comprising a silanated amine, and wherein for light at a wavelength of 0.6328 microns incident on the optical film from each major side of the optical film, the optical assembly has a reflected root mean square wave front error of less than about 0.5 waves.

17. The optical assembly of claim 16, wherein the average thickness of the first optical bonding layer is less than about 0.2 microns.

18. The optical assembly of claim 16, wherein the optical film comprises a plurality of polymeric layers numbering greater than about 50 in total.

19. The optical assembly of claim 16, wherein the silanated amine comprises one or more of a 3-aminophenyl trimethoxy silane (APTMS), a 3-aminopropyl trimethoxy silane (APrTMS), a 3-aminopropyl triethyl silane (APrTES), and a 3-aminophenyl triethoxy silane (APTES).

* * * * *